United States Patent [19]

Steurmer

[11] Patent Number: 4,789,055

[45] Date of Patent: * Dec. 6, 1988

[54] APPARATUS FOR ARRANGING ARTICLES IN A PREDETERMINED MANNER AND METHOD OF MAKING SAME

[75] Inventor: Karl H. Steurmer, New Richmond, Ohio

[73] Assignee: Planet Products Corporation, Cincinnati, Ohio

[*] Notice: The portion of the term of this patent subsequent to Dec. 23, 2003 has been disclaimed.

[21] Appl. No.: 945,699

[22] Filed: Dec. 23, 1986

Related U.S. Application Data

[63] Continuation of Ser. No. 550,180, Nov. 9, 1983, Pat. No. 4,630,725, which is a continuation-in-part of Ser. No. 292,741, Aug. 19, 1981, Pat. No. 4,421,222.

[51] Int. Cl.⁴ .............................................. B65G 47/26
[52] U.S. Cl. ..................................... 198/425; 198/628
[58] Field of Search ............ 198/423, 425, 461, 463.4, 198/463.6, 604, 718, 626, 627, 628

[56] References Cited

U.S. PATENT DOCUMENTS

| | | | |
|---|---|---|---|
| 2,254,860 | 9/1941 | Rose | 198/628 |
| 2,273,509 | 2/1942 | Braren | 198/628 X |
| 2,757,780 | 8/1956 | Sousa | 198/425 |
| 2,996,169 | 8/1961 | Gentry | 198/628 |
| 3,194,382 | 7/1965 | Nigrelli et al. | 198/425 X |
| 3,263,794 | 8/1966 | Burton | 198/425 |
| 3,401,728 | 9/1968 | Allen et al. | 198/626 X |
| 3,424,293 | 1/1969 | Deutschlander | 198/425 |
| 3,482,674 | 12/1969 | Wiseman | 198/461 |
| 3,589,497 | 6/1971 | Leach | 198/607 X |
| 3,717,751 | 2/1973 | Fluck | 198/503 X |
| 3,938,650 | 2/1976 | Holt | 198/425 |
| 4,093,063 | 6/1978 | Calvert et al. | 198/425 |
| 4,421,222 | 12/1983 | Stuermer | 198/382 |
| 4,630,725 | 12/1986 | Steurmer | 198/425 |
| 4,709,609 | 12/1987 | Rautio | 198/626 X |

FOREIGN PATENT DOCUMENTS 2052420 1/1981 United Kingdom ................ 198/425

Primary Examiner—Robert J. Spar
Assistant Examiner—Cheryl L. Gastineau
Attorney, Agent, or Firm—Kinney & Schenk

[57] ABSTRACT

Randomly oriented articles of roughly equal size are arranged in a predetermined pattern employing an apparatus which comprises a device for receiving the articles and disposing same in at least one substantially rectilinear row and in a single layer thereof, an accumulator for receiving the articles from the row with the accumulator having a moving apparatus for moving the articles therethrough and a cooperating gate system for controlling the articles moving through the accumulator, and a collection device for collecting the articles from the accumulator wherein the gate system alone or cooperating with the moving apparatus provides improved control of any desired number of articles through the accumulator.

9 Claims, 8 Drawing Sheets

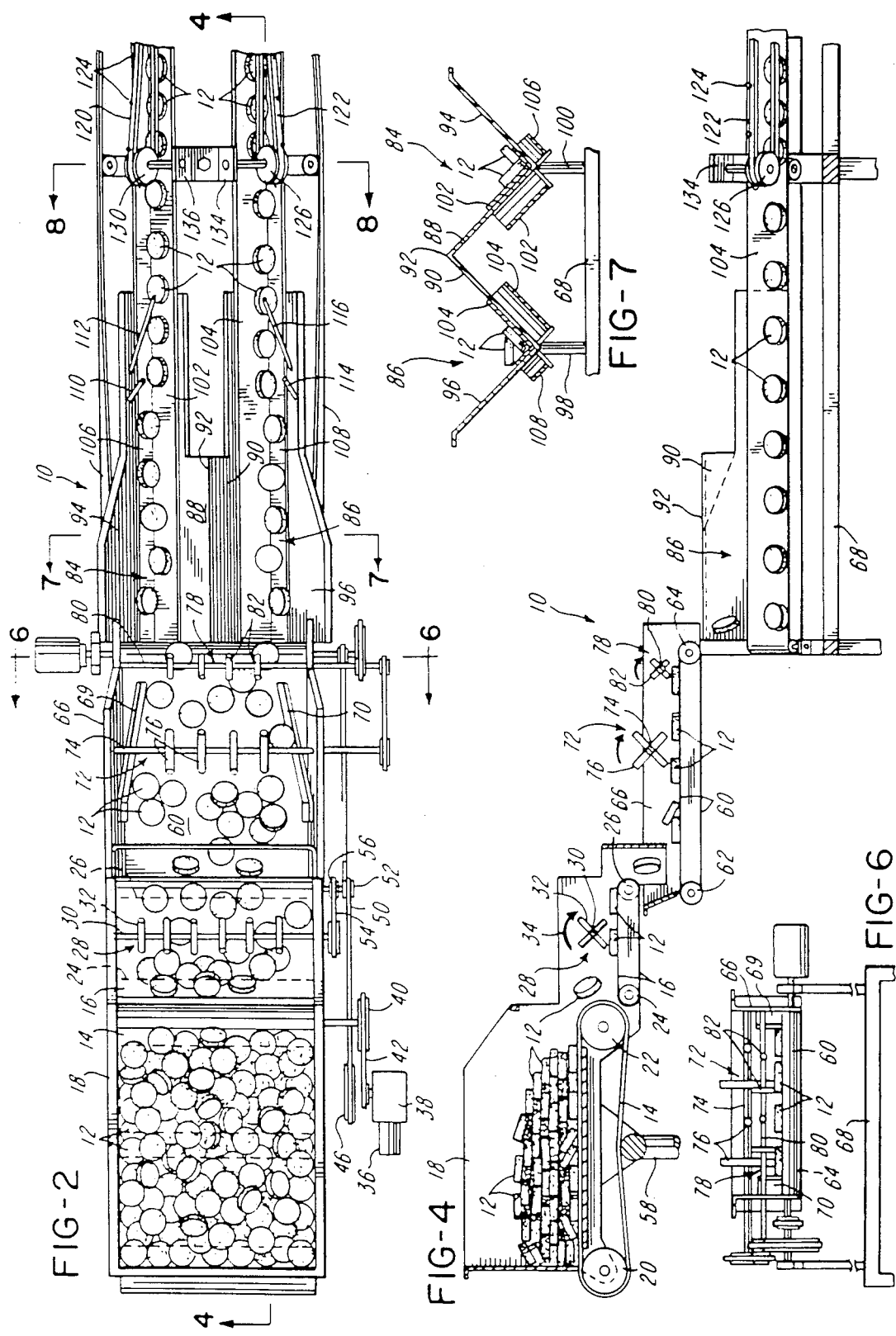

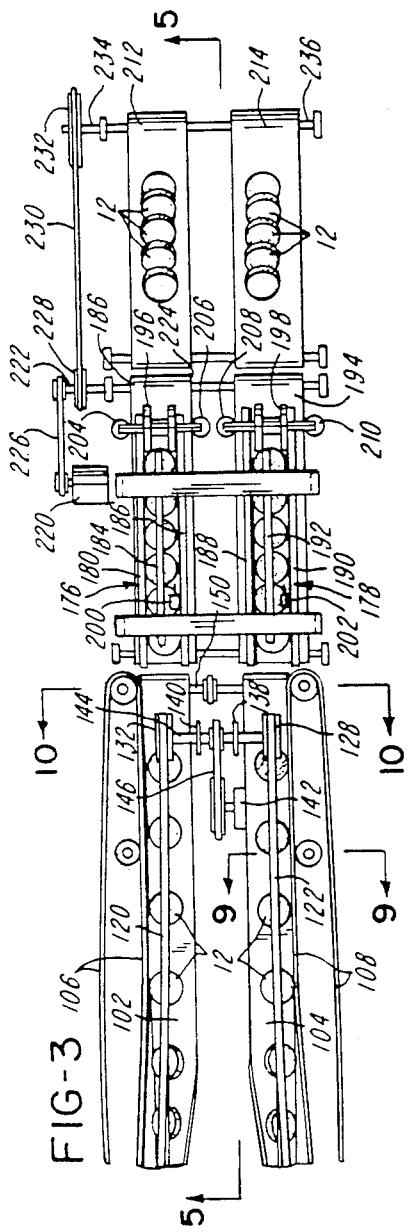
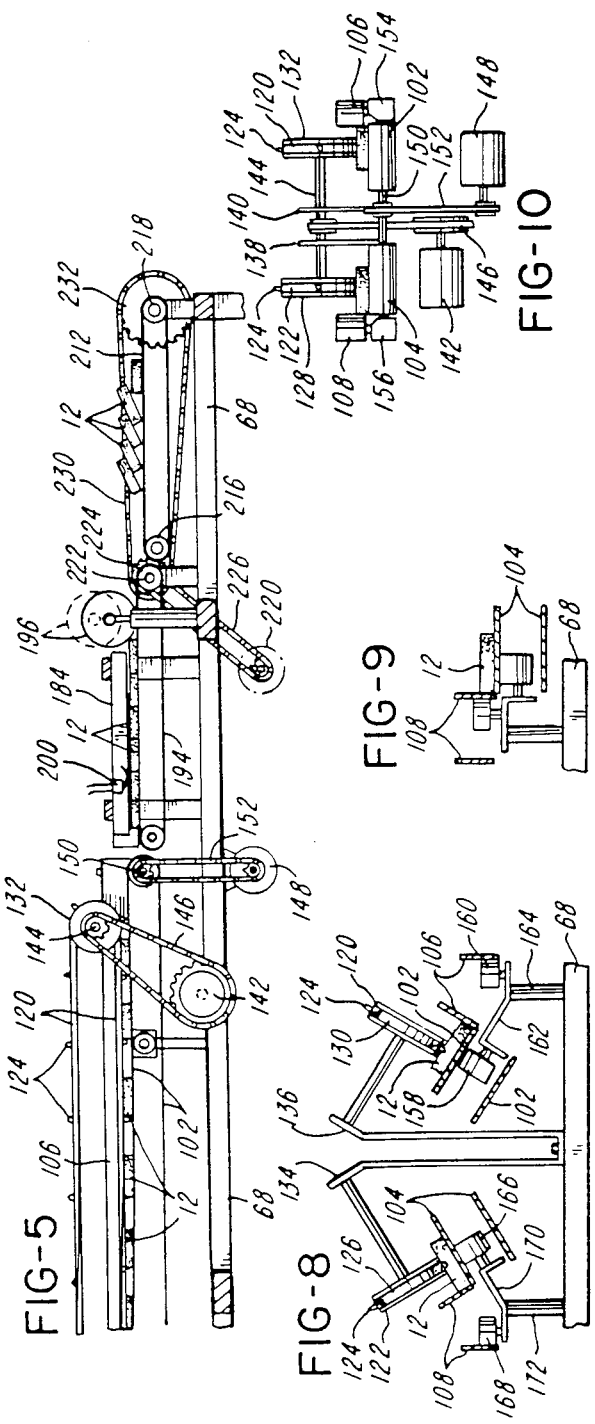

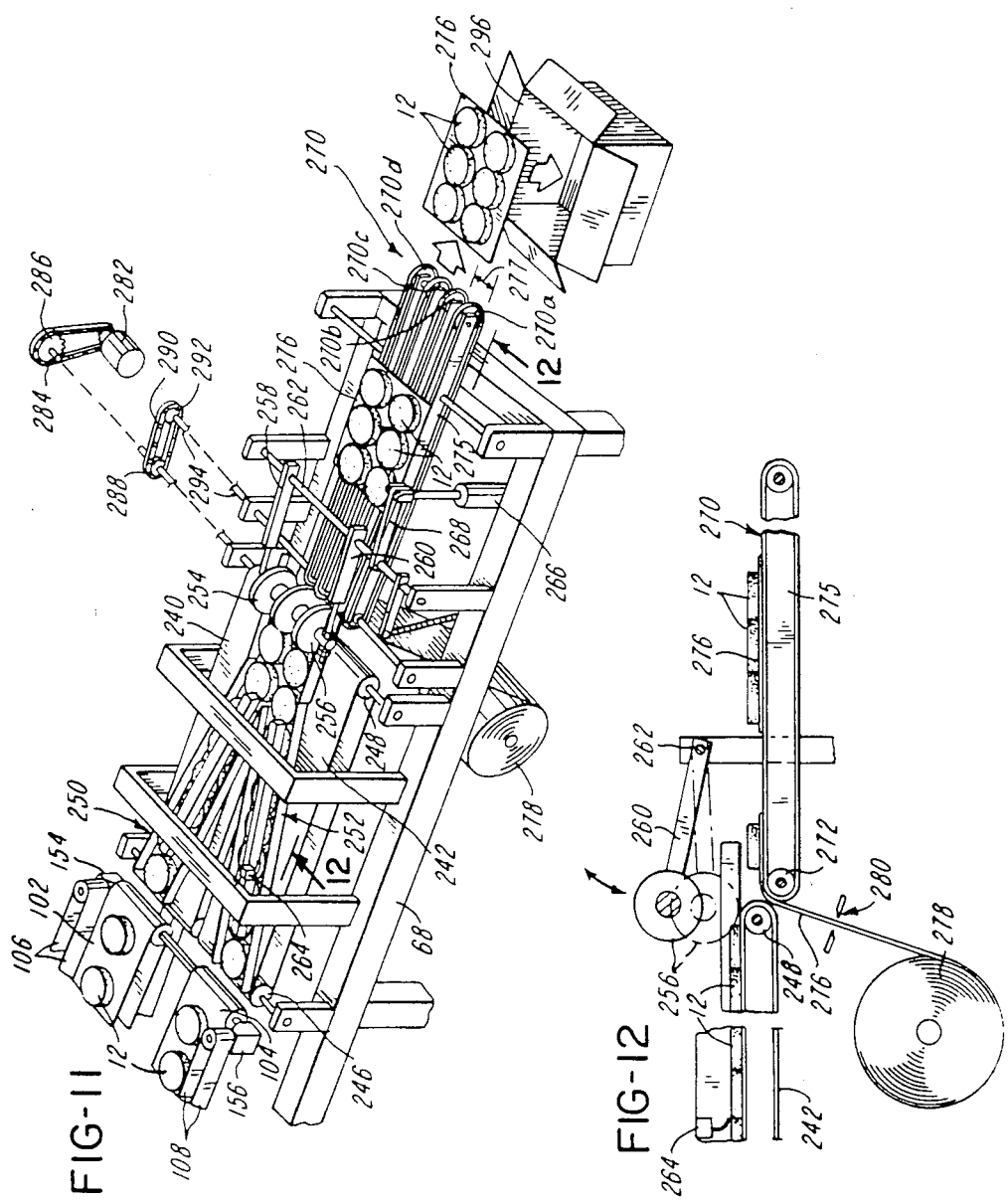

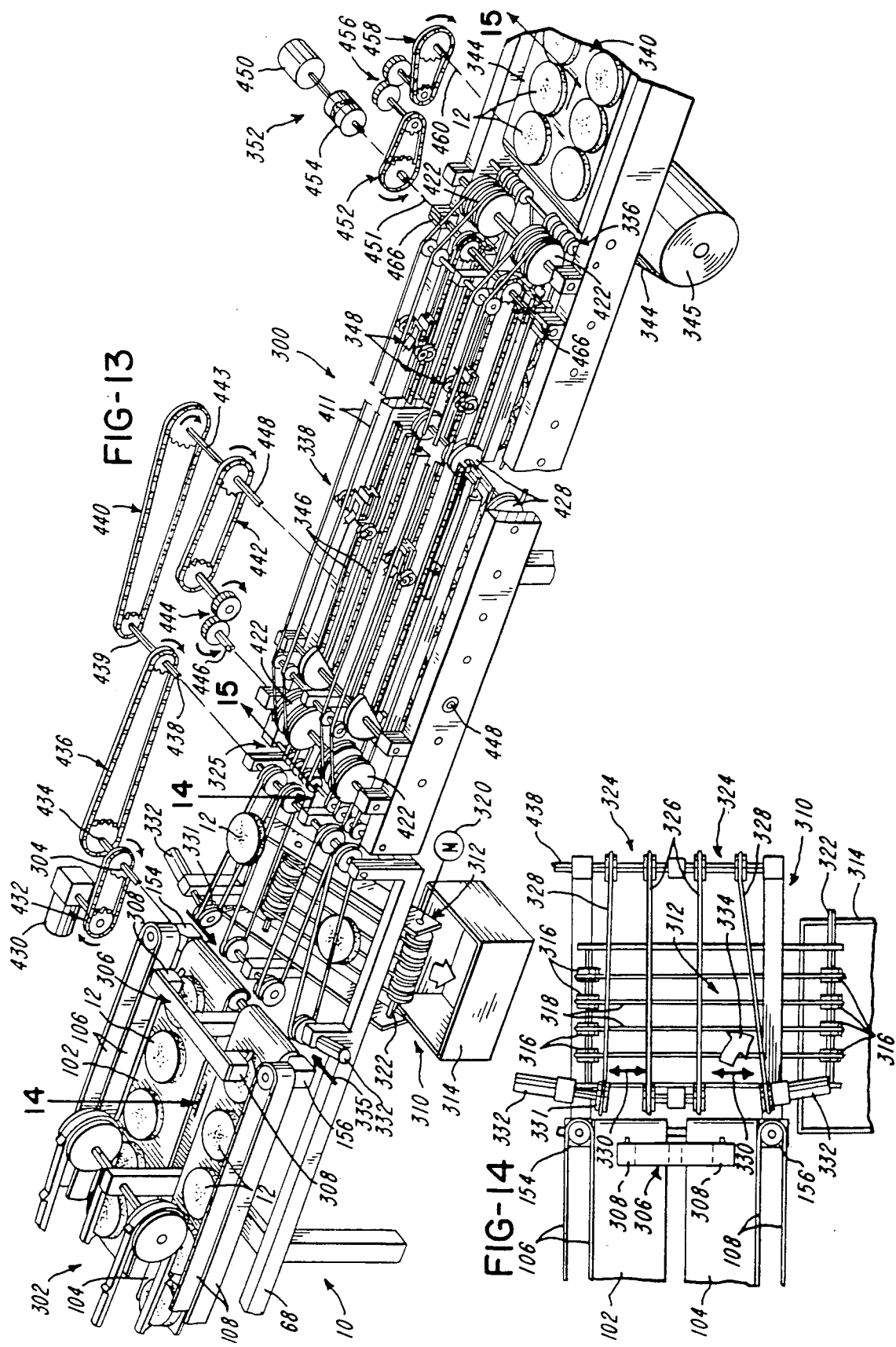

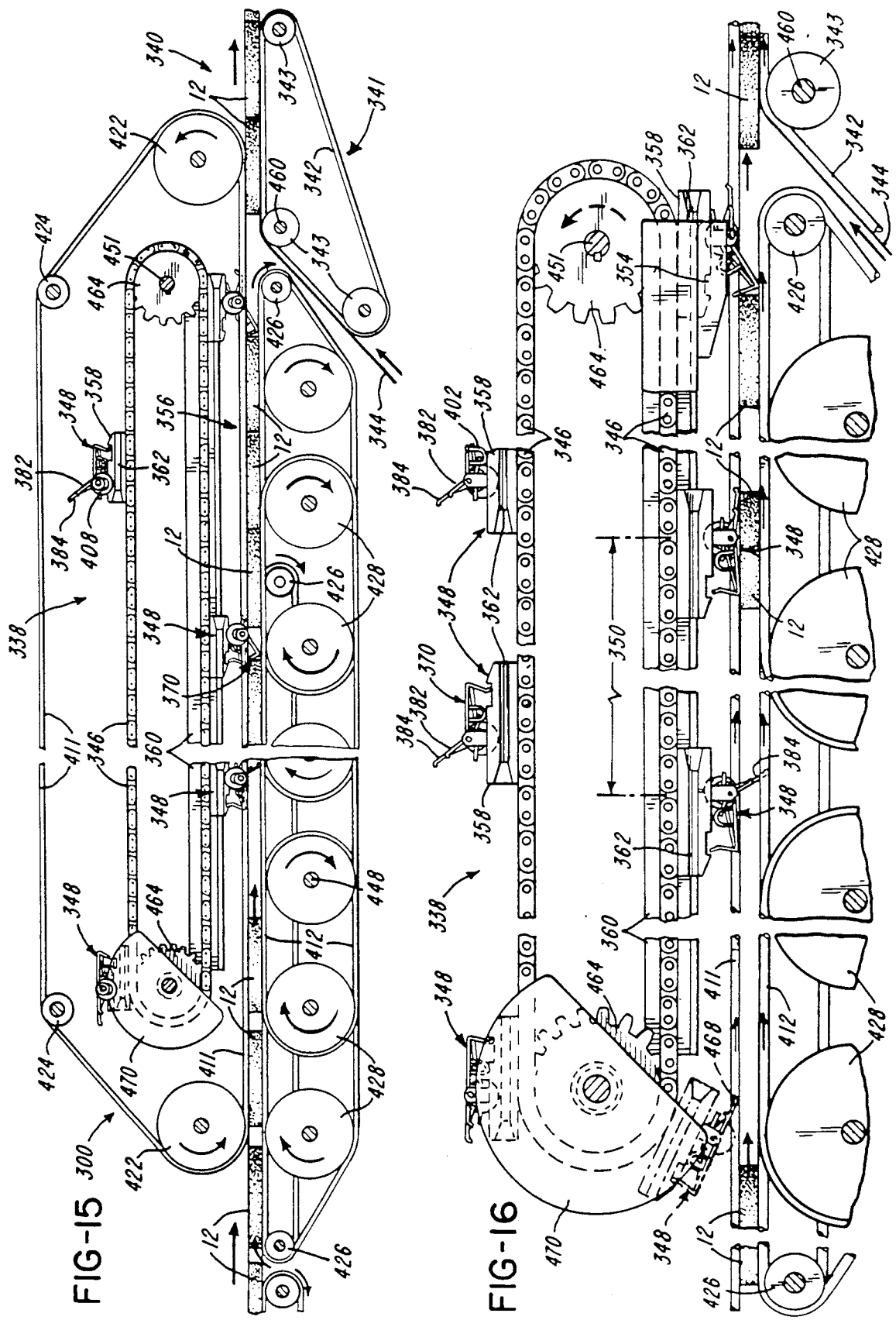

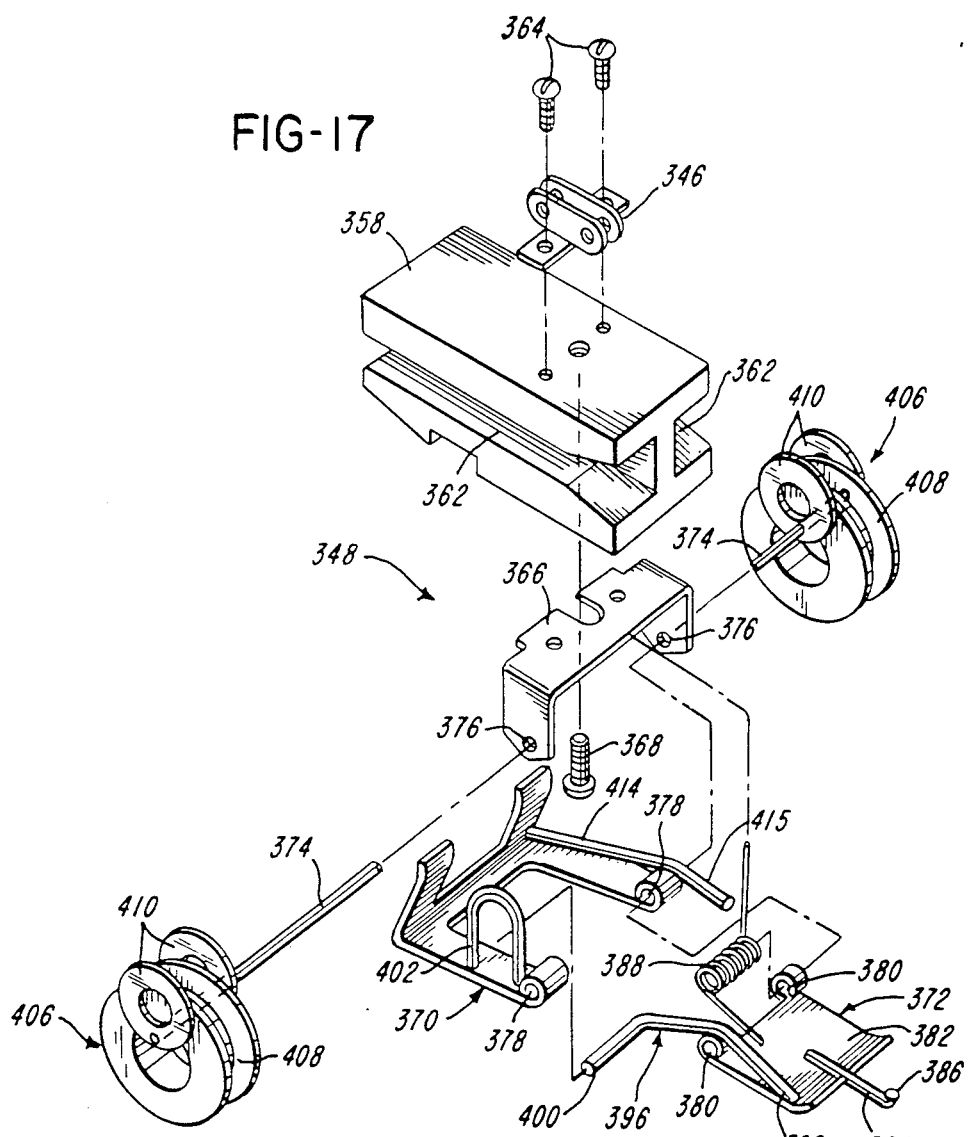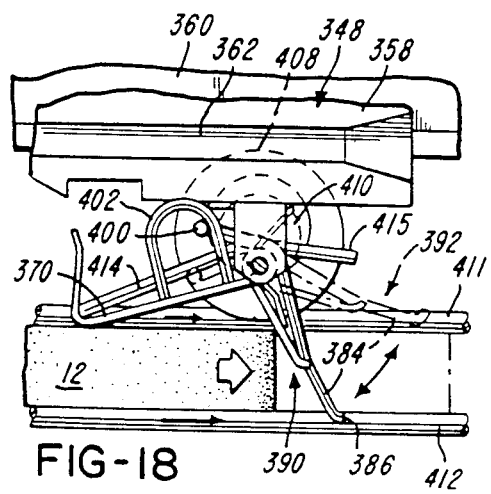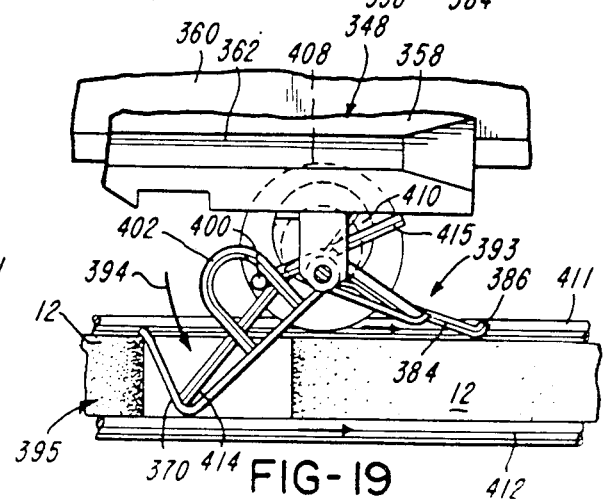

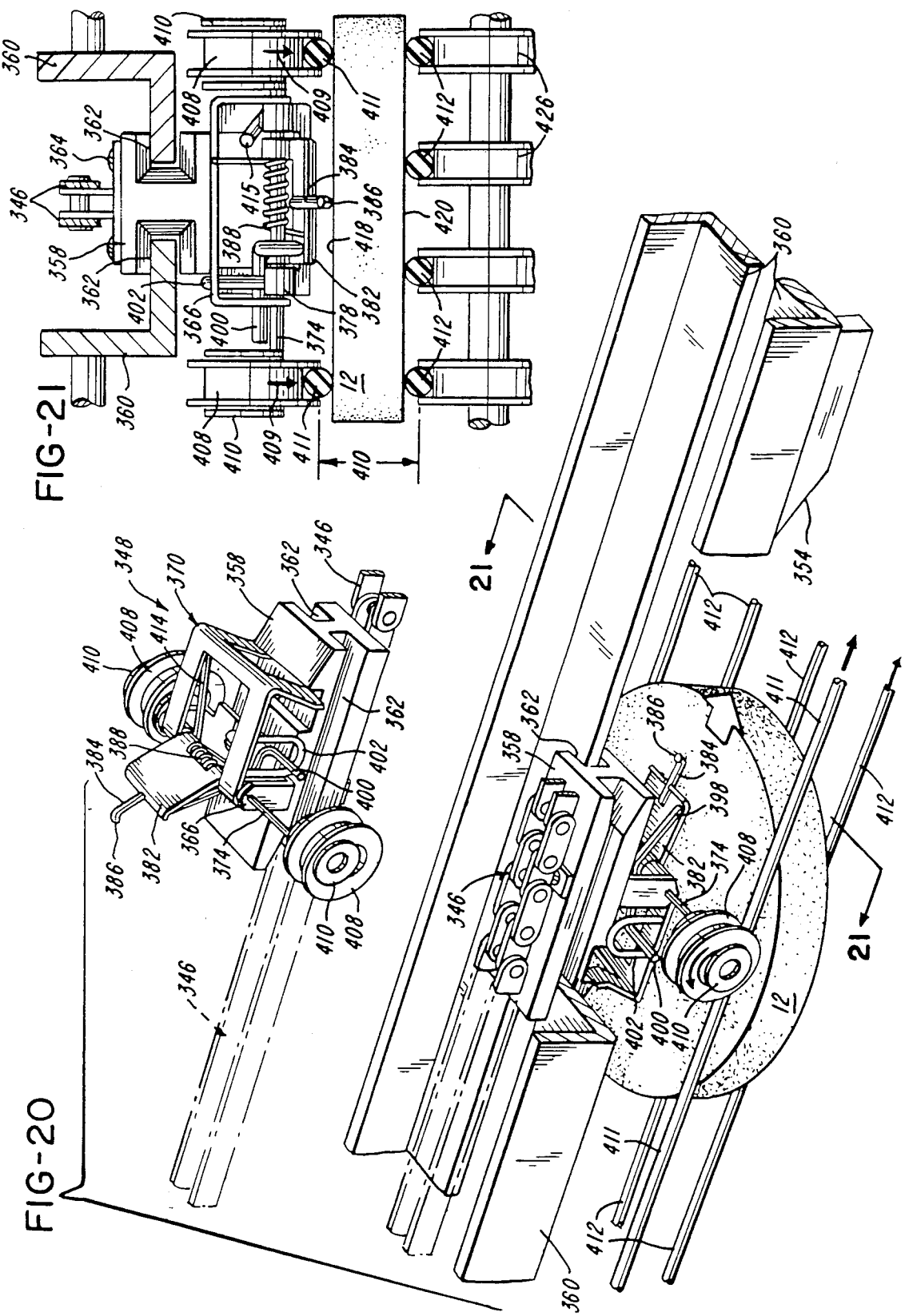

APPARATUS FOR ARRANGING ARTICLES IN A PREDETERMINED MANNER AND METHOD OF MAKING SAME

CROSS REFERENCE TO RELATED APPLICATION

This application is a continuation of copending U.S. application Ser. No. 550,180, filed Nov. 9, 1983, which issued into U.S. Pat. No. 4,630,725, which in turn was a continuation-in-part of its copending U.S. application Ser. No. 292,741 filed Aug. 19, 1981, which issued into U.S. Pat. No. 4,421,222.

BACKGROUND OF THE INVENTION

1. Field of the Invention

This invention relates to an apparatus for arranging randomly oriented articles of roughly equal size in a predetermined pattern and to a method of making such apparatus.

2. Prior Art Statement

It is known in the art and as disclosed in the above-mentioned U.S. Pat. No. 4,421,222 to provide an apparatus for arranging randomly oriented articles of roughly equal size in a predetermined pattern and which comprises, means for receiving the articles and disposing same in at least one substantially rectilinear row and in a single layer thereof, an accumulator for receiving the articles from the row with the accumulator having moving means for moving the articles therethrough and cooperating gate means for controlling the articles moved through the accumulator and with the moving means and gate means being independently driven, and a collection device for collecting the articles from the accumulator. However, in the above-mentioned apparatus, the accumulator portion thereof does not provide control of articles in an optimum manner.

The need also exists in an apparatus of the above type to provide suitable gates which prevent what is referred to as a shingling of articles being processed therethrough. In addition, the need exists to provide precise control in apparatus of the above type of any desired plurality of articles in a more positive manner than has been proposed heretofore.

Thus, it is apparent that apparatus of the above type have deficiencies.

SUMMARY OF THE INVENTION

This invention provides an improved apparatus for arranging articles of roughly equal size in a predetermined patern and which overcomes the above-mentioned deficiencies. In particular, such apparatus comprises a device for receiving the articles and disposing same in at least one substantially rectilinear row and in a single layer thereof, an accumulator for receiving the articles from the row with the accumulator having moving means for moving the articles therethrough and cooperating gate means for controlling the articles moved through the accumulator and with the moving means and gate means being independently driven, and a collection device for collecting the articles from the accumulator.

In accordance with one embodiment of this invention the gate means of the above-mentioned improved apparatus comprises a mechanism supported for movement in an endless path with the mechanism being disposed above at least a portion of the accumulator, a plurality of gates carried by the mechanism in spaced relation with a particular pitch between immediately adjacent gates establishing a predetermined number of the articles therebetween, and means for serially indexing the mechanism a distance equal to the pitch to thereby move a gate disposed immediately adjacent the collection device and thus allow movement of the predetermined number of articles immediately upstream of the immediately adjacent gate out of the accumulator to the collection device.

In accordance with another embodiment of this invention an improved apparatus is provided for arranging randomly oriented articles in a predetermined pattern and comprises a device for receiving the articles and disposing same in at least one substantially rectilinear row and in a single layer thereof, an accumulator for receiving the articles and moving a predetermined number thereof through the accumulator, and a collection device for collecting the articles from the accumulator; and, wherein the accumulator comprises moving means engaging top and bottom surfaces of the articles and sandwiching same therebetween with the moving means serving to move the articles to the collection device and with the accumulator having means for controlling the predetermined number of articles.

Accordingly, it is an object of this invention to provide an improved apparatus of the character mentioned.

Another object of this invention is to provide an improved method of making an apparatus if the character mentioned.

Other features, objects, uses, and advantages of this invention are apparent from a reading of this description which proceeds with reference to the accompanying drawings forming a part thereof.

The above-mentioned U.S. Pat. No. 4,421,222 is incorporated herein by reference thereto; however, in order that this disclosure will be self sufficient and complete, the major portion of the text of such application will be repeated herein.

BRIEF DESCRIPTION OF THE DRAWINGS

The accompanying drawings show present preferred embodiments of this invention, in which

FIG. 2 is a plan view of the upstream end of the apparatus illustrated in FIG. 1;

FIG. 3 is a plan view of the downstream end of the apparatus illustrated in FIG. 1;

FIG. 4 is an elevational view of the upstream portion of the apparatus as illustrated in FIG. 2 taken along the line 4—4 of FIG. 2;

FIG. 5 is an elevational view of the apparatus as illustrated in FIG. 3 taken along the line 5—5 in FIG. 3;

FIG. 6 is a view taken along the line 6—6 of FIG. 2 and illustrating the interrelationship between a pair of rakes and frozen hamburger patties on the apparatus of FIG. 1;

FIG. 7 is a view taken along the line 7—7 of FIG. 2 and illustrating several frozen meat patties being transported along a pair of converging surfaces with each pair of converging surfaces having both bottom and side conveyors;

FIG. 8 is a view taken along the 8—8 FIG. 2 and showing the relationship between the frozen meat patties, the bottom and side conveyors, and a flexible drive belt;

FIG. 9 is a view taken along the line 9—9 of FIG. 3 showing one of the lanes of the frozen hamburger patties being transported by one set of bottom and one set of side veyors;

FIG. 10 is a view taken along the line 10—10 of FIG. 3 illustrating two sets of bottom and side conveyors and two flexible drive belts and their relationship to drive motors;

FIG. 11 is an isometric view of a modification of the downstream end portion of the apparatus of FIG. 1 showing a plurality of frozen hamburger patties being positioned upon a severed piece of paper;

FIG. 12 is a view taken along the line 12—12 of FIG. 11,

FIG. 13 is an isometric view of another modification of the downstream end portion of the apparatus of FIG. 1;

FIG. 14 is a view taken along the line 14—14 of FIG. 13;

FIG. 15 is a view with parts in cross section, parts in elevation, and parts broken away taken along the line 15—15 of FIG. 13;

FIG. 16 is an enlarged view with parts broken away particularly illustrating components shown in the central portion of the illustration of FIG. 15;

FIG. 17 is an exploded isometric view of a typical gate comprising gate means of the apparatus as modified in FIG. 13;

FIG. 18 is a view illustrating a frozen hamburger patty as it enters a typical gate;

FIG. 19 is a view illustrating the gating action provided as the patty, moves through the gate;

FIG. 20 is an enlarged isometric view with parts in cross section, parts in elevation, and parts broken away particularly illustrating a hamburger patty halfway through a typical gate; and FIG. 21 is view taken essentially on the line 21—21 of FIG. 20.

DETAILED DESCRIPTION

Figure 1:
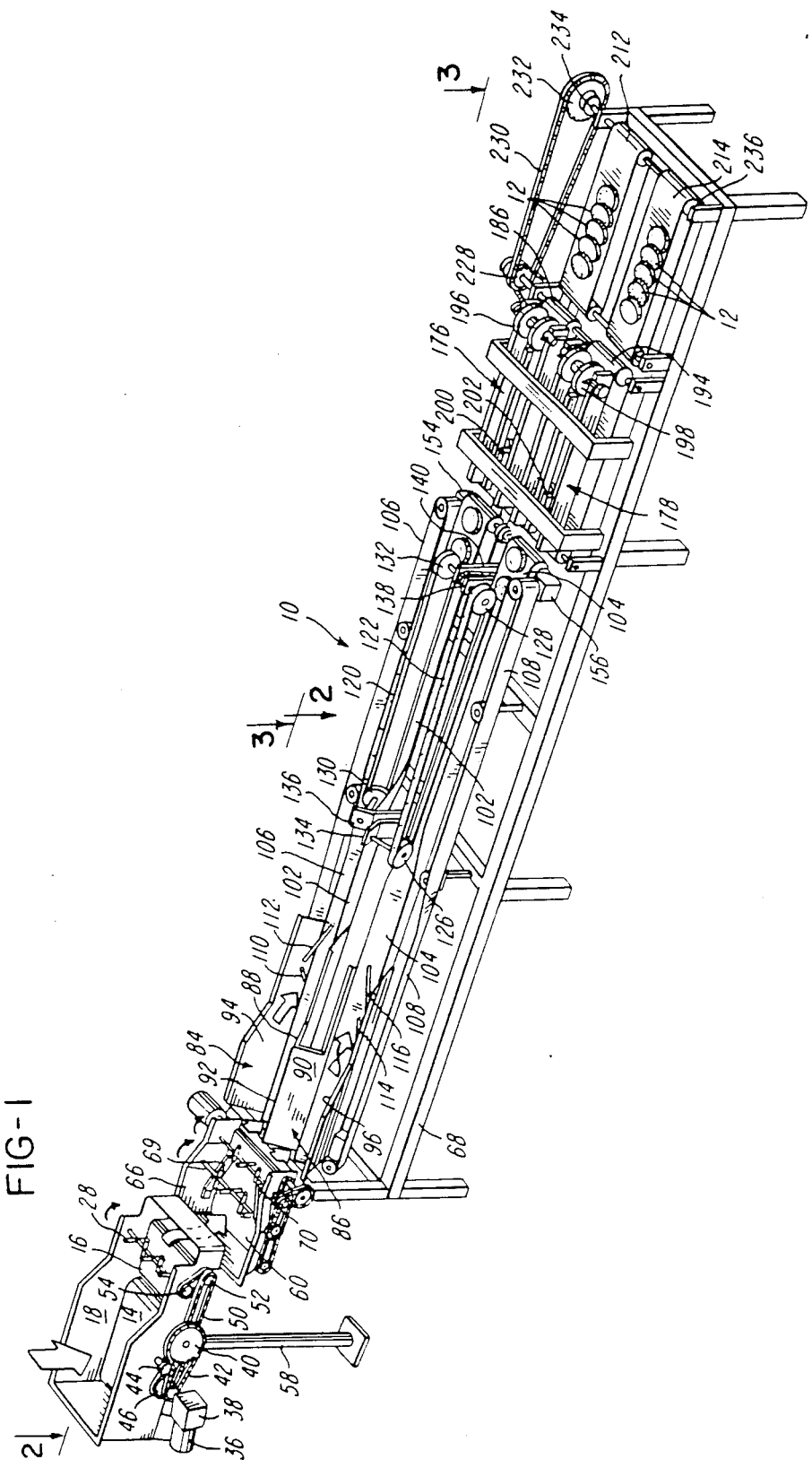
FIG. 1 is an isometric view of an apparatus for receiving randomly oriented articles in the form of frozen meat patties and stacking such articles in an aligned shingled relationship.

The above-mentioned U.S. Pat. No. 4,421,222 is incorporated herein by reference thereto. Further, in order that this disclosure will be self-sufficient and complete, the major portion of the text of such application will be repeated herein.

Referring now to the drawings and to FIG. 1 in particular an apparatus for receiving randomly oriented and spaced articles or workpieces of a wide range of shapes and sizes is generally designated by the numeral 10. The apparatus 10 is illustrated as receiving multitude of articles in the form of frozen hamburger patties collectively identified by the numeral 12 from a first conveyor 14. While on the conveyor 14, the hamburger patties 12 are randomly spaced and oriented. This random distribution of patties on the conveyor 14 is illustrated in FIG. 2. The first conveyor 14 transports the frozen patties 12 from left to right in the depiction of FIGS. 1 and 2 and discharges the patties 12 onto a second conveyor 16 which is aligned with the first conveyor 14.

Both the conveyors 14 and 16 are illustrated as driven about rollers rotatably secured within a hopper frame 18, conveyor 14 being driven about rollers 20 and 22 and conveyor 16 being driven about rollers 24 and 26. The hopper frame 18 is designed to receive a large quantity of patties 12 for deposit on the conveyor 12. A first alignment means shown as a rake 28 is positioned about the second conveyor 16. This rake 28 is the first of a series of devices for insuring that none of the patties that reach the downstream end of the apparatus 10 are in a shingled or overlying relationship and includes a rotatable drive shaft 30 extending in a direction substantially parallel to the rollers 24 and 26 (as well as rollers 20 and 22) with a plurality of axially spaced fingers 32 extending radially therefrom. As best seen in FIG. 4, the radial extension of these fingers 32 terminates about the conveyor 16, the radial terminus of fingers 32 being spaced from belt 16 by a predetermined distance slightly in excess of the height of a single frozen pattie 12 lying flatly on the conveyor belt 16. In this way, any patties that are lying atop or shingled upon another pattie 12 will be dislodged from that position to a position lying flatly upon the conveyor 16. It is also seen from arrow 34 in FIG. 4, that the rotation of fingers 32 is in the same direction as the conveyor belt 16 so that the underside of rake 28 moves in a direction that is generally opposite that of the topside or working surface of conveyor belt 16.

FIGS. 1 and 2 show that the conveyors 14 and 16 and the rake 28 are driven in timed relationship to each other. Motor drive 36 operates through a gear box 38 to drive a gear 40 by way of a chain 42. The chain 42 also rotates a gear 44 (see FIG. 1) which, in turn, rotates a gear 46 which rotates the roller 26 through a chain 50 and a gear 52. The rake 28 is driven by a chain 54 which joins a gear connected to its drive shaft 30 and a gear 56 affixed to the drive shaft of roller 26. The hopper frame 18 is elevated above the ground by a vertical support 58.

Patties discharged from the conveyor 16 are dropped onto a third conveyor 60 which is supported on rollers 62 and 64. The rollers 62 and 64 are rotatably secured in a weight basket 66 supported upon a frame 68. The weight basket 66 senses the weight of its contents and, when the sensed weight exceeds a predetermined weight, limits further accumulation of patties 12 on conveyor 60 by terminating upstream operation of conveyors 14 and 16 until such time as the accumulated weight falls below the predetermined weight. Because the operation of weight baskets is well known to those skilled in the art, a detailed description thereof will be omitted in the interests of brevity.

The frame 68, along with the vertical support 58 and the floor upon which both supports are resting, forms a base for the illustrated apparatus. The conveyor 60 is aligned with the conveyors 14 and 16 with the rollers 62 and 64 having axes of rotation generally parallel to the axes of rollers 20, 22, 24 and 26. Weight basket 66 also has a pair of angularly oriented guides 69 and 70 (see FIGS. 1 and 2) convergingly angled in the downstream direction of the conveyor 60 and spaced intimately above the conveyor 60 so as to direct any patties on the outer edges of the conveyor belt 60 onto the inner portion thereof. A pair of rakes, similar to rake 28 above conveyor 16, are disposed above conveyor 60. The first of these two rakes, positioned above conveyor 60, is identified by the numeral 72 and includes a drive shaft 74 rotatably journaled in weight basket 66 and a plurality of finger-like projections 76 extending radially outward from drive shaft 74. Like the fingers 32 of rake 28, the radial terminus of fingers 76 are spaced from the top surface of conveyor 60 by a distance slightly in excess of the height of a single frozen pattie 12. The second of these to rakes above conveyor 60 is downstream of the rake 72 and is identified by the numeral 78 and includes a drive shaft 80 rotatably mounted in the weight basket 66 with a plurality of radially extending fingers 82. Also like the fingers of rakes 28 and 32 before it, fingers 82 terminate above the conveyor 60 by a distance slightly in excess of the height of a single frozen pattie 12. Like rake 28, rakes 72 and 78 serve to dislodge any stacked or shingled patties and to position all of the patties 12 flatly upon the top of the conveyor belt (conveyor belt 60 in the case of rakes 72 and 78).

As will be best appreciated from a viewing of FIG. 4, the various conveyors 14, 16 and 60, as well as rakes 32, 72 and 78, create a cascading effect in which the quantity of workpieces or patties 12 is gradually and progressively reduced and the control over the patties and their distribution is gradually and progressively increased. Such a gradual and progressive multi-step operation has proven to be most effective. By the time the frozen patties 12 have traveled beneath the three rakes 28, 72 and 78, any stacked or shingled patties 12 should have been eliminated and all of the patties should be flatly lying on the conveyor belt 60.

Patties discharged from the conveyor 60 over roller 64 are dropped into one of a pair of obliquely oriented (with respect to the horizontal) V-shaped downwardly converging configurations 84 and 86. These V-shaped surfaces are shown most clearly in FIGS. 1, 2 and 7. The V-shaped surfaces 84 have an angularly disposed interior surface 88 which adjoins an angular surface 90 of V-shaped surfaces 86 at an apex 92 formed at the interface of the surfaces 88 and 90. Each of the surfaces 88 and 90 has a mating and angularly disposed surface with which the surfaces 88 and 90 cooperatively form a V-shaped configuration surface 94 cooperating with surface 88 to form the V-shaped configuration 84 and surface 96 cooperating with surface 90 to form the V-shaped configuration 86. Columnar supports 98 and 100 (FIG. 7) extend upwardly from the frame 68 to support the V-shaped converging surfaces 86 and 84 respectively.

Each of the surfaces 88, 90, 94 and 96 has a transport conveyor belt which is substantially co-planar with their interior surfaces. Conveyor 102 being substantially co-planar with surface 88 and conveyor 104 being substantially co-planar with surface 90. Similarly, the outer surfaces 94 and 96 have conveyor surfaces which are virtually co-planar therewith. Conveyor 106 is virtually co-planar with outer surface 94 and a surface of conveyor 108 is virtually co-planar with a surface of surface 96. For reasons which will be apparent in the following description, conveyors 102 and 104 will be identified as "bottom" conveyors for purposes of description while conveyors 106 and 108 will be identified as "side" conveyors.

As illustrated in the depiction of FIG. 7, when the patties 12 fall into the V-shaped configurations 84 and 86, they may be resting against the inside surface and belts 102 or 104 or the inside surface and belts 106 and 108 or both. It will also be seen from FIG. 7 that the inner surfaces 88 and 90 as well as their respective conveyors 102 and 104 serve to limit downward gravity biased sliding movement of workpieces on the outer surfaces 94 and 96 so as to stop the downward sliding movement of a workpiece at a position on the conveyors 106 and 108. The same is true of outer surfaces 94 and 96 and their respective conveyors 106 and 108 with respect to inner surfaces 88 and 90. In other words, a pattie 12 sliding down obliquely oriented surface 88 will have its gravity biased sliding movement terminated by surface 94 and conveyor 106. At this terminating position, the pattie 12 will be resting against conveyor 102.

The illustrated embodiment is designed to orient all of the patties 12 so as to lie against the bottom belts 102 and 106 on the inside surfaces 88 and 90. In order to achieve this desired orientation' the outside surfaces 94 and 96 each have a pair of workpiece alignment means in the form of finger-like guide projections angularly extending toward the mating surface in a downstream direction. Finger guides 110 and 112 extend outwardly from the surface 94 into the path of any pattie 12 lying against the outer surface 94 or belt surface 106 or resting upon both of the inner and outer surfaces 88 and 94 or both of the belts 102 and 106. When the patties 12, in any of these orientations, engage the finger-like projection guides 110 or 112, the patties 12 are flipped and forced to resume an orientation in which they are flatly lying against the inner surfaces 88 and 90 and against the bells 102 and 104 in particular. Patties lying flatly against the conveyor belts 102 and 104 pass by the fingers 110 and 112 unimpeded. Two different finger guides 110 and 112 are used so as to engage patties of several different orientations as they pass by guides within the V-shaped configurations 84 and 86.

Outer surface 96 has two fingers 114 and 116 which extend into the V-shaped opening 86 and which are similar to the fingers 110 and 112 on surface 94 except that they are symetrically arranged with respect thereto. The operation of these fingers 110 and 116 is identical to that of fingers 110 and 112 with the fingers 114 and 116 forcing orientation of the patties against the surface of bottom conveyor belt 104.

After passing by the fingers 110 and 112 and 114 and 116, all of the patties are lying flatly against the conveyor belts 102 and 104. These conveyor belts 102 and 104, however, are convoluted or partially spiraled so as to change planes downstream of the fingers 110, 112, 114, and 116 to an orientation that is substantially horizontal. In the downstream horizontal orientation, the conveyor belts 102 and 104 are located directly beneath the frozen patties 12 and the gravity bias exerted on the patties no longer urges the patties to the sides of the conveyor belts 103 and 104. Nevertheless, side conveyors 10B and 108 are also partially spiraled and remain in substantially perpendicular relationship to the conveyors 102 and 104. This parallel partial spiraling of the side conveyors 106 and 108 prevent the workpieces 12 from sliding off the bottom conveyors during the transition to horizontal orientation. It is because the conveyors 102 and 104 are beneath and the conveyors 106 and 108 beside the patties 12 that they are termed "bottom" and "side" conveyors. respectively for purposes of description. The bottom and side conveyors 102, 104 and 106, 108 travel at approximately twice the nominal rate of conveyor 60 within weight basket 66. This disparity with the speed of conveyor 60 results in large and random spaces between the patties on the upstream end of angled conveyors 102, 104, 106 and 108.

A flexible cleated belt is positioned above each of the belts 102 and 104 as they begin their transition from the oblique orientation within the V-shaped configuration of surfaces 84 and 86 to the substantially horizontal downstream relationship described above. Cleated belt 120 is positioned above the conveyor belt 102 and cleated belt 122 is positioned above the conveyor belt 104, both of these cleated belts 120 and 122 being rotated with linear velocities in excess of the linear velocity of the respective conveyor belts 102 and 104 disposed beneath the cleated belts 120 and 122. Further, the cleated belts 120 and 122 are rotated in a direction that is opposite that of the conveyor belts 102 and 104. Consequently, the underside (which constitutes the working surface) of belts 120 and 122 of the cleated belts 120 and 122 and the topside (which is the working surface) of conveyor belts 102 end 104 are proximally located with respect to each other and travel in the same linear direction.

The cleated belts 120 and 122 are preferably highly flexible and have a plurality of outwardly projecting cleats 124. The belts 120 and 122 are also spaced above the conveyor belts 102 and 104 by a distance slightly in excess of the spacing of a single frozen pattie 12. In the event that a pattie 12 manages to survive the series of rakes 28, 74 and 80, as well as the fingers 110, 112 or 114 and 116 in a stacked or shingled relationship to another pattie, the uppermost of the stacked or shingled patties will be engaged by the cleats 124 on one of the flexible belts 120 and 122. When the top one of a pair of stacked or shingled patties is engaged by the cleats 124 of belts 120 and 122, one of the belts 120 or 122 advances that top pattie at a speed that is greater than that of the bottom belts 102 or 104. Due to the disparity in speeds between the belts 102, 104, 106 and 108 one hand and conveyor 60 on the other hand, there is, as mentioned above, a large spacing between the patties 12 on belt 102 or 104 as they commence their interaction with the cleated belts 120 and 122. As a shingled or overlayed pattie is accelerated with respect to its underlying pattie, it is relocated in one of these large spacings. The cleated belts 120 and 122 thus eliminate any stacked or shingled patties that may have passed beneath the rakes or fingers upstream or which may have developed in the downstream travel therefrom.

The cleated belts 120 and 122 are supported above the top surface of conveyor belts 102 and 104 by a pair of pulleys 126 and 128 above conveyor belt 104 and a pair of pulleys 130 and 132 above conveyor belt 102. These pulleys ace, in turn, rotatably supported by a pair of angled supports 134 and 136 and a pair of columnar supports 138 and 140, with angled supports 134 and 136 supporting pulleys 126 and 130 respectively and columnar supports 138 and 140 supporting pulleys 128 and 132 respectively. As most clearly shown in FIG. 8, the angled support 136 and 138 extend upwardly from the frame 68. Although not as clearly illustrated in the drawings, the columnar supports 138 and 140 similarly extend upwardly from the frame 68.

As shown in FIGS. 8 and 9, cleated belts 120 and 122 are driven by a motor 142 which rotatably powers a drive shaft 144, to pulleys 128 and 132 by way of a chain drive 146. A motor 148 drives the conveyor belts 102 and 104 through a common drive shaft 150 and a chain drive 152. As further seen from the depiction of FIG. 10, the side conveyors are driven off of drive shaft 150 through angled gear boxes, side conveyor 106 being driven through angled gear box 154 and side conveyor 108 being driven through angled gear box 156.

FIGS. 8 and 9 show that the bottom (102 and 104) and side (106 and 108) conveyors are engaged at their intermediate portions by support rollers. FIG. 8 shows the underside of the top portion of conveyor belt 102 being engaged by support roller 158 and the inner surface of the outer portion of side conveyor 106 being engaged by support roller 160. Both of the support rollers 158 and 160 are rotatably mounted to an angle support 16Z which is supported above the frame 68 by a columnar support 164. Similarly, the underside of the top portion of conveyor belt 104 is engaged by support roller 166 and the inner surface of the outer portion of side conveyor 108 is engaged by support roller 168. The support rollers 166 and 168 are both rotatably mounted to angle support 170 which is rigidly mounted atop a columnar support 172 extending upward from the frame 68.

While transported by the bottom conveyors 102 and 104, the patties 12 are irregularly and unpredictably spaced from each other. A queuing or accumulation conveyor 186 or 104 is thus used to arrange the patties 12 in a regulated end to end relationship. Frozen patties discharged from the bottom conveyors 102 and 104 are directed into guide chutes 176 and 178. Each of these guide chutes are formed from a pair of horizontal side guides and a vertical guide positioned over a queuing or accumulation conveyor 186 or 194. Guide chute 176 consists of horizontal side guides 180 and 182 which are horizontally spaced by a distance slightly in excess of the diameter of one of the frozen patties 12. A vertical guide 184 is equally spaced between the side guides 180 and 192 and is vertically spaced above the conveyor by a distance exceeding the vertical height of one of the patties. The guide chute 176 is positioned above the queuing or accumulation conveyor 186. Similarly, guide chute 178 includes horizontal side guides 188 and 190 and vertical guide 192. The guide chute 178 is positioned above the queuing or accumulation conveyor 194.

When directed into one of the guide chutes 176 and 178, the first of a plurality of patties 12 are advanced along respective conveyors 186 and 194 until such time as the first of these patties engages a spool gate, spool gate 196 being disposed at the downstream end of guide chute 176 and spool gate 198 being disposed at the downstream end of guide chute 178. When the first pattie so engages the spool gate, downstream movement of that pattie 12 on the conveyor belt 186 or 194 is terminated and relative movement between that pattie 12 and the subjacent conveyor belt 186 or 194 moving underneath commences.

Downstream movement of a second of a plurality of patties 12 continues until it engages the first pattie at which time the second pattie is held stationary by the first while the conveyor belt 186 or 194 continues to move beneath the pattie. This process continues until such time as a predetermined number of patties is queued in an accumulated end to end relationship in the chute. When a counter 200 or 202 indicates a count equal to this predetermined number, a pair of cylinders are activated to lift one of the spool gates 196 or 198. Counter 200 is positioned on chute 176 and is advanced one increment by each pattie 12 passing through chute 176 and counter 202 is positioned on chute 178 and is incrementally advanced by each pattie 12 passing through the chute 178.

After the counters 200 and 202 have reached a predetermined count (five in the illustrated embodiment of FIGS. 1–10), the cylinders associated with the counter reaching that count are activated to lift corresponding spool gates 196 or 198. Cylinders 204 and 206 are attached to the ends of spool gate 196 and responsive to counter 200. Similarly cylinders 208 and 210 are affixed to the ends of the spool gate 198 and are responsive to counter 202.

The lifting of spool gates 196 or 198 permits the queue off patties 12 collected in end to end relationship behind the spool gate 196 or 198 to be discharged onto collection belts 212 or 214. FIG. 5 shows the collection belt 212 rotatably mounted on rollers 216 and 218, both of which are rotatably secured to the frame 68. A motor 220 drives a shaft 222 which is joined to a roller 224 driving the conveyors 186 and 194 by way of a chain drive 226. Roller 218 of conveyor 212 is driven off shaft 222 through a sprocket 228 affixed to shaft 222, a chain drive 230 and a sprocket 232 affixed to shaft 234, which chain drive and sprockets drive the roller 218. A corresponding driving roller 236 for collection belt 214 is driven likewise. Since the sprocket 23Z has a greater diameter than that of sprocket 228, the collection belts 212 and 214 are moved at a rate which is slower than the rate of conveyor belts 186 and 194. The movement of the conveyors 186, 194 and 212, 214 are thus in timed relationship to each other. Due to the disparity in the speeds of the belts 186 and 194 on one hand and 212 and 214 on the other hand, the patties 12 are presented in a straight shingled (or overlapped) fashion on the collection belts 212 and 214. This arrangement is highly predictable and orderly and permits an operator standing alongside the connection belts 212 and 214 to quickly grasp the shingled collection and to place all of the shingled patties 12 in a container for shipment.

Reference is now made to FIGS. 11 and 12 for a detailed description of the modification of the downstream portion of the apparatus depicted in FIGS. 1–10. In this modification or modified version of the apparatus, the bottom conveyors 102 and 104 are discharged onto queuing conveyors 240 and 242, which are both supported upon rollers 246 and 248, the rollers 246 and 248 being rotatably mounted to the frame 68. A pair of queuing or accumulation chutes 250 and 252 are constructed similar to the previously described chutes 176 and 178, excepting that they are convergingly directed in the downstream direction to bring the patties 12 in side-by-side relationship at the downstream end of the chutes 250 and 252. The queuing chutes are positioned above the respective queuing conveyors 240 and 242 and received patties discharged from bottom conveyors 102 or 104.

Spool gates 254 and 256 are positioned at the downstream end of the chutes 250 and 252. Unlike the spool gates 128 and 132 of FIGS. 1–10, the spool gates 254 and 256 are joined together and secured upon their end portions by a swingable support. This swingable support includes two arms 258 and 260 which are rigidly attached to a rotatable shaft 262. When counter 264 mounted on chute 252 reaches a predetermined count, a cylinder 266 is actuated to pull down a lever arm 268. The lever arm 268 is rigidly attached to the rotatable shaft 262 and downward movement of a piston within cylinder 266 effectuates an upwardly arcuate movement of spool gates 254 and 256. When the spool gates 2S4 and 256 are so moved, the accumulated queue of patties 12, which have collected behind the gates 254 and 256, are released and discharged onto a plurality of spaced and aligned collection conveyors 270 extending beyond the queuing or accumulation conveyors 270 and 242. A sheet of paper 276 is interposed between the collection conveyors 270 and the patties 12. This sheet 276 is advanced from paper roll 278 and is severed by a set of knife blades 280 positioned between the paper roll 278 and the collection conveyor 270.

The queuing or accumulation conveyors 240 and 242, as well as the collection conveyor 270, are driven by a motor 282 which drives a shaft 284. The shaft 284 drives the rollers 248 and the conveyors 240 and 242. A sprocket 286 transmits the rotary power between motor 282 and shaft 284. A further sprocket 288 affixed to shaft 284 transmits the received power through a drive chain 290 on a further sprocket 292. This further sprocket 292 is affixed to a drive shaft 294 which powers the roller 272 of the collection conveyor 270. Since the sprockets 288 and 292 are of the same diameter, conveyors 240 and 242 travel at the same speed as collection conveyors 270. There are four collection conveyors 270 in the illustrated embodiment of FIG. 11. These four conveyors 270a, 270b, 270c and 270d are parallel to each other and spaced by a distance 277 which is substantially less than the diameter of the patties 12. Further, each of the spaced conveyors 270a, 270b, 270c and 270d is supported on its discharge end by a pulley 273, which is, in turn, rotatably supported by a pair of flat plates 275. Each pair of flat plates is cantilevered outwardly so as to leave the axial spacings 277 free of obstructions. These unobstructed axial spacings 277 permit a forklike lifting instrument to be positioned beneath the pattie carrying sheet of paper 276 from the discharge end of the conveyors for quick or automated removal of the patties 12 and paper 276 for packaging. When removed from the collection conveyors 270. the patties 12 are uniformly spaced in side-by-side aligned relationship with each other atop the sheet of paper 276 for placement into a shipping box 296. An operator standing alongside the collection conveyor 270 merely picks up the paper 276 with the orderly arrangement of patties 12 thereon and stacks the paper and patties in the box 296 for shipment. Alternatively, an automated piece of equipment may remove and package the predictably arranged patties 12 and paper 276.

Reference is now made to FIGS. 13 through 21 of the drawings which illustrate another modification of the apparatus of this invention and such modification is presented to describe what will be referred to as a modified accumulator of the apparatus 10 and the modified accumulator will be designated by the reference numeral 300. The accumulator 300 may be used interchangeably with the previously described accumulator portions of the apparatus 10 as will be apparent from the following description.

In the modified apparatus 10 as shown in FIGS. 13–21, articles or hamburger-type patties move from the upstream end of the machine through what will be referred to as an unscrambler portion 302 of such machine; and, the patties are moved by bottom conveyors 102 and 104 and side conveyors 106 and 108, as previously described. The belts 102 and 104 are driven by common shaft 304, and the side conveyors 106 and 108 are driven by the shaft 304 through the previously described angled gear boxes 154 and 156 respectively.

As the patties exit the unscrambler portion 302 of the apparatus 10 a sensing mechanism 306 comprised of a pair of switches each designated by the same reference numeral 308 detect or ascertain the height of a patty passing therebeneath. If two or more patties are present in stacked relation each switch 308 actuates suitable controls in an accumulator feed device 310 in a manner now to be described. The accumulator feed device 310 is comprised of a belt assembly 312 disposed in a downwardly inclined relation so that any patties falling thereon will be conveyed into a bin or receptacle 314 disposed therebeneath.

As seen in FIG. 14, the assembly 312 consists of a plurality of spaced pulleys 316 and the pulleys 316 have belts 318 disposed therearound such that the top portions of the belts 318 are disposed in a substantially common plane and in a downwardly inclined relation toward the bin 314. The belts 318 are typical polymeric belts of circular cross section and may have suitable reinforcing cords therein, as is known in the art. For simplicity, the belts 318 will be referred to as O-ring belts. The belts 318 comprising the belt assembly 312 are driven by a drive motor 320 through a common shaft 322 disposed at the lower end of the assembly 312.

The accumulator feed device 310 also has two sets of O-ring belts 324 each consisting of a belt 326 which is adapted to be operated in an endless path at a fixed position and a movable belt 328 which is adapted to have one end portion thereof moved toward and away from its associated belt 326 as shown by the double arrow 330 in FIG. 14, for example. Each movable belt 328 has a pulley 331 which is movable by an actuator in the form of an actuating cylinder 332, toward and away from its associated belt 326. Each pulley 331 is rotatably mounted on an axially extensible and retractable shaft of its cylinder 322. The belts 326 and 328 are moved as will be described later to move patties 12 through the feed device 310.

Having described the components of the feed device 310, the description will now proceed with a description of the operation of device 310. Accordingly, each switch 308 is electrically connected, by any suitable means known in the art and not shown, such that if a switch 308 ascertains that the height of a patty passing thereunder is too high, i.e., two or more patties are disposed in stacked relation, the switch 308 actuates its associated cylinder 332 causing the belt pulley 331 operatively associated with such cylinder 332 to be moved such that the upstream portion of its belt 328 is moved a substantial distance away from its associated belt 326 and as is shown at 334 in FIG. 14 whereby patties riding on the top flights of O-ring belts 326 and 328 drop by gravity through the opening provided at 334 onto the belt assembly 312 whereby the dropped patties are moved into the bin 314. Once the bin 314 is filled with patties 12 it is carried to the upstream end of the apparatus 10 and the patties are again introduced into such apparatus 10 for processing, as previously described. It will also be appreciated that other switch means, shown schematically by an arrow 335 in FIG. 13, may also be provided to actuate the cylinders 332 in the event there are too many patties approaching the accumulator 300 to thereby assure that the accumulator 300 operates in the proper manner and without likelihood of jamming.

From the above description, it is seen that the apparatus 10 provides means for arranging randomly oriented articles of roughly equal size in a predetermined pattern and comprises means for receiving the patties and disposing same in at least one substantially rectilinear row and in a single layer thereof; and, such means in this modification of the invention comprises the accumulator feed device 310 which cooperates with the unscrambler portion 302 of the apparatus 10. In addition, in the modification of the invention presently being described, means is provided for receiving the articles 12 and disposing same in a plurality of two substantially rectilinear rows of patties with each row consisting of a single layer thereof; and, the accumulator 300 is particularly adapted to receive articles from each row and as shown at 325, for example.

The accumulator 300 has moving means which will be designated generally by the numeral 336, FIG. 13, for moving the patties 12 therethrough and cooperating gate means 33R for controlling the patties being moved through the accumulator 300. The moving means 336 and the gate means 338 are independently driven, in a manner to be subsequently described; and, it will be seen that the apparatus 10 has a collection device 340 which may be similar to a collection device previously described, or may be a modification of such previously described collection device.

The collection device 340 comprises a conveyor assembly 341 (FIG. 15) which is adapted to receive patties 12 from each row; and, the assembly 341 comprises a belt conveyor 342 which is carried by rollers 343 with the downstream roller 343 being a driven roller. The collection device 340 also comprises a web 344 of paper, or the like, unrolled from supply roll 345 thereof. The paper 344 is initially introduced onto the belt conveyor 342 and patties 12 are then introduced on the paper 344. In addition, a cutting and supporting device (not shown) of any suitable type known in the art is provided downstream of the assembly 341 for cutting the paper 344 away with the patties 12 supported on such paper 344. It will be appreciated that any desired number of patties 12 may be cut away together with the sheet 344 therebeneath. FIG. 11 illustrates a sheet with six patties 12 thereon which has been cut away by the cutting and supporting device mentioned above. The thus cut away patties and sheet may be further processed and/or packaged, as desired.

Referring now to FIGS. 15 and 16, it is seen that the gate means 338 comprises a mechanism which is shown as an endless chain conveyor 346 and is supported for movement in an endless path. The mechanism or chain conveyor 346 is disposed above at least a portion of the accumulator 300; and, in this example of the invention the mechanism 346 extends over substantially the major part of the central portion of the accumulator 300.

The mechanism or chain conveyor 346 comprises a plurality of gates each designated generally by the reference numeral 348, and the gates 348 are carried by such mechanism in spaced relation with a particular pitch 350 between immediately adjacent gates. The pitch 350 establishes a predetermined number of articles such as frozen meat, i.e., frozen hamburger, patties 12 between such immediately adjacent gates 348. The apparatus 10 and in particular the accumulator 300 thereof has means 352 serially indexing the mechanism or chain conveyor 346 a distance equal to the pitch 350 to thereby move the gate 348 which is disposed immediately adjacent the collection device 340 and thus allow movement of the predetermined number of articles or patties immediately upstream of such immediately adjacent gate out of the accumulator 300 to the collection device 340—FIG. 13.

The accumulator 300 also comprises a cam structure 354 which is adapted to actuate each of the gates 348 upon movement thereof thereagainst. The cam structure 354 has cooperating cam surfaces which are adapted to engage associated surfaces on each gate 348 to provide actuation thereof.

Reference is now made to FIGS. 17, 18, and 19 of the drawings for a detailed description of a typical gate 348 and the description of this typical gate is fully applicable to all gates 348. In particular, each of the gates 348 comprises means enabling movement of the patties therepast and also providing a gating action upon being actuated by the cam structure 354, as previously described, or by a particular article or patty 12, as will now be explained. The gating action by a particular patty is defined as the gating action that would be provided by the last patty of the predetermined number of patties actuating the gate it has just moved past. The gating action serves to prevent movement past its associated gate 348 of the next article or patty 12 upstream thereof.

The means 352 for indexing the mechanism or chain conveyor 346 the distance equal to the pitch 350 serves to move an exit gate, i.e., a gate engaging the cam structure 354, away therefrom in the direction of the collection device 340 to thereby allow movement of a predetermined number of patties 12 immediately upstream of the exit gate out of the accumulator 300 to the collection device 340. In the modified accumulator of FIGS. 13-21 the predetermined number of patties associated with each gate means 338 consists of three patties, as shown at 356 in FIG. 15.

The moving means 336 and the gate means 338 are independently driven as previously mentioned. However, such moving means 336 and gate means 338 cooperate such that the moving means 336 serves to move the patties 12 through the accumulator 300 to the collection device 340 during indexing of the mechanism or chain conveyor 346. The moving means 336 provides comparatively high speed movement of patties 12 as will be subsequently described. The gate means 338, in essence, selectively "holds back" the desired number of patties between gates so that the gate means ultimately and efficiently controls the flow of patties 12 without any delay from the moving means.

Each of the gates 348 comprising the gate means 338 is of unique construction and as will now be described in detail and with particular reference being made to the gate illustrated in FIG. 17 of the drawings. The description of the gate 348 of FIG. 17 is fully applicable to all gates 348. Accordingly, each gate 348 comprises a block which may be referred to as a slider or support block 358, and the block 358 is particularly adapted to be slid along a cooperating pair of associated substantially identical L-shaped slide rails 360 which support same for sliding movement—FIG. 20.

The rails 360 are suitably supported over the central portion of the accumulator 300 and as will be readily apparent from FIGS. 15 and 16 of the drawings. The support block 358 is basically of I-shaped cross-sectional configuration and has substantially identical grooves 362 on opposite sides thereof and the cooperating surfaces defining such grooves 362 are adapted to be engaged and supported by horizontally extending legs of the L-shaped slide rails 360. The slide rails 360 are supported in precise horizontal alignment over the central portion of the accumulator 300; and, the support block 358 is fastened to an associated chain conveyor by threaded bolts 364 which extend through an associated link of the chain conveyor 346 and through threaded openings in the slider block 358.

The gate 348 has a roughly U-shaped bracket 366 which is detachably fastened to the support block by a threaded bolt 368. The gate 348 also has a stop 370 for stopping movement of patties 12 therepast upon actuation thereof. The gate 348 also has a trigger 372 for actuating the stop 370 in a manner to be described in detail subsequently and means is provided for supporting the stop 370 and trigger 372 on the bracket 366 for pivoting movement. In this example such means is in the form of a shaft 374 which extends through a plurality of aligned openings 376 in the bracket, 378 in the stop, and 380 in the trigger 372. The trigger 372 is adapted to be operated by the last patty of the predetermined number of patties and by the cam structure 354, as previously described.

The trigger 372 comprises a plate 382 and an extension rod 384 which is fixed to the top surface of the plate and extends beyond an outer edge of such plate 382. The rod 384, in essence, provides an extension of the plate and assures engagement of the last patty of the predetermined number of patties even when the patties vary in size. Further, the rod 384 has its inner end portion fixed to the top surface of the trigger plate 38Z and has an arcuate outer end 386 which curves away from the trigger plate 382, with the trigger plate engaging a patty, and the arcuate outer end 386 assures that a patty is not stabbed by the outer end of the rod 384.

As previously mentioned, the means for supporting the stop 370 and trigger 372 comprises means in the form of the common shaft 374 whereby the stop 370 and trigger 372 are supported for pivoting movements about the shaft 374. The gate 348 further comprises a spring 388 acting between the block 358 and the trigger plate 382; and, the spring 388 normally yieldingly urges the stop 370 out of its stop position whereby the trigger plate 382 and hence the rod 384 carried thereby are pivoted into the path of movement of patties as seen in FIG. 18.

The spring 388 is in the form of a torsion spring and has opposite end portions engaging the top surface of the plate 382 and the block 358 respectively. The spring 388 is adapted to be at least partially overridden to allow movement of patties past its associated gate and, after a predetermined number of patties (three in this example) is received between an immediately adjacent pair of gates 348 the last patty 12 operates the trigger 372 causing same to override the spring 388 and actuate the stop 370. As each patty 12 moves against a gate 348 it engages the trigger 372 thereof, as shown at 390, moving same to the dotted line position shown at 392 and allowing movement of such patty beyond the gate, provided there is sufficient space for movement downstream of such gate. However, once the required number of patties 12 is disposed between immediately adjacent gates the last patty (third patty in this example) cannot go any further because it is held against movement by the other two patties downstream thereof. The last patty 12 actuates the trigger 372, as shown at 393 in FIG. 19, by obstructing downward movement thereof causing spring 388 to be overridden and causing stop 370 to be pivoted to its stop position, as shown by the arrow 394. Once the stop 370 is in its stop position, a leading patty 12 shown at 395 engages such stop and becomes the first of another set of three patties disposed between immediately adjacent gates 348.

Referring again to FIG. 17, it is seen that the trigger 372 of the gate 348 has an L-shaped actuating member 396 which has one end portion 398 which in this example is slightly curved and fixed to the trigger plate 382 and an opposite end portion 400 which is adapted to engage and actuate the stop 370. The end portion 400 is adapted to be received within a U-shaped member 402 which has the terminal ends of is parallel legs fixed to the top surface of the stop 370. End portion 400 is received within the opening defined by the U shape.

As mentioned earlier, the gate 348 utilizes a shaft 374 and such shaft has a pair of roller mechanisms, each designated generally by the same reference numeral 406, supported thereby at its opposite ends. Each roller mechanism 406 consists of a flanged roller 408 and a pair of washer-like axial retainers 410 supported by the shaft 374 on opposite sides of each roller 408. The roller mechanisms 406 operate against the top surface of each patty, at opposite sides thereof, as shown in FIG. Z1 to apply pressure thereagainst as each patty is moved therebeneath. The application of pressure is illustrated schematically by the arrows 409 in FIG. 21 of the drawings; and, the vertical spacing 410 between top 0-ring belts 411 and bottom O-ring belts 412 of the moving means 336 and the construction and arrangement of the roller mechanisms 406 assure adequate pressure on patties 12 to assure efficient movement thereof through the accumulator 300. The construction, arrangement, and operation of the belts 411 and 412 will be described in more detail subsequently.

The gate 348 also comprises a limit member 414 which is best shown in FIGS. 17–19. The member 414 is fixed to the stop 370 and limits the extent or amount that the stop can move into its stop position. To accomplish this, the member 414 has an end portion 415 which engages the block 358.

As previously mentioned the accumulator 300 has moving means 336 for moving articles therethrough and such moving means is of unique construction and comprises means for engaging top and bottom surfaces of the articles or patties 12 and sandwiching same therebetween. The moving means 336 comprises belt means and such belt means comprises the previously mentioned top O-ring belts 411 and bottom O-ring belts 412. The top belts 411 consist of two belts engaging the top surfaces of the patties 12 and the bottom belts 412 consist of four belts engaging the bottom surfaces of the patties 12, and as best seen in FIG. 21.

Each of the plurality of endless belts 411 and 412 of this exemplary embodiment is a so-called O-ring belt, as previously mentioned, whereby each belt has a circular cross-sectional configuration. In addition, each belt has a maximum dimension perpendicular to its longitudinal axis which is a small fractional part of the surface dimension of the articles or patties 12 to be engaged by the belts 411–412. With this construction, each patty 12 has an exposed unsupported top surface portion 418, of substantial dimension, between the two belts 411 engaging the top surface of the patty. Similarly, each patty 12 has exposed unsupported bottom surface portions, shown typically at 420, between the belts 412 engaging the bottom surface of the patty 12. Each endless belt 411–412 may be made using any suitable means and method known in the art and each may be suitably reinforced with a plurality of turns of reinforcing cord centrally embedded therein.

Referring now to FIG. 21 of the drawings, the patties 12 are substantially circular and a diametral cross-sectional dimension of each belt 411–412 is a small fractional part of the diameter of a typical patty 12.

In this example of the invention a plurality of two endless belts 411 are provided for engaging the top surfaces of the patties 12 associated with each chain conveyor 346. The belts 411 associated with each chain conveyor 346 are operated around grooved pulleys 422 at their opposite ends and intermediate idler pulleys 424, as best seen in FIG. 15. Similarly, four belts 412 are provided in association with each conveyor 346 for engaging and supporting the bottom surfaces of the patties 12. The four belts 412 associated with each chain conveyor 346 have pulleys 426 at their opposite ends and intermediate idler pulleys 428. Only a representative few of the pulleys are designated by the appropriate reference numeral 428. It will also be appreciated that in some applications, a different number of O-ring belts may be provided in association with the top and bottom surfaces of the patties, as desired.

As previously described in connection with the description of the unscrambler portion 302 of the apparatus and the presentation of FIG. 13, the bottom belts 102 and 104 and side belts 106 and 108 are driven by means of a drive shaft 304. The drive shaft 304 is driven by motor and gear box assembly 430 through a chain and sprocket drive assembly 432. The shaft 304 also has an extension 434, which extends in a direction away from the unscrambler portion 302, and drives another drive assembly 436. The drive assembly 436 drives the upper belts of the accumulator feed device 310 by driving a shaft 438 operatively associated with such upper belts.

The shaft 438 has an extension 439 which drives a chain and sprocket drive assembly 440 which in turn drives another chain and sprocket drive assembly 442 through a shaft 443. The assembly 442 drives a pair of cooperating gears 444 and one of the gears of such pair has a shaft 446 extending therefrom which drives the grooved pulleys or sheaves 422 at the upstream end of the accumulator 300 to thereby drive the top belts 411.

The shaft 443 which is common to assemblies 440 and 442 has an extension 448 which extends toward the accumulator 300. The extension shaft 448 is operatively connected to one of the lower pulleys 428 and thereby drives the lower belts 412.

Thus it is seen that the moving means 336 for the patties 12 consists of belts 411 and 412 which are basically driven from the same drive through appropriate mechanical connections. The belts 411–412 are driven and operated at a comparatively high speed as previously mentioned, so that as the patties 12 enter the accumulator 300 the belts 411 and 412 move such patties at high speed, except as otherwise controlled by the gate means 338 in a precise manner. The gate means 338 and in particular the gates 348 thereof are independently driven or operated; and, the movement of the gates is provided by the drive assembly 352, as previously mentioned.

The drive assembly 352 consists of a drive motor 450 which operates a drive assembly 452 through a clutch 454 which is in essence, a so-called one revolution clutch, i.e., upon energizing the motor 450 the clutch 454 operates one revolution and stops. The one revolution of the clutch 454 results in movement of gates 348 a rectilinear or lineal distance equal to the gate pitch 350 so that a particular gate 348, which will be referred to as an exit gate, being temporarily held by the cam structure 354 is moved away therefrom and the clutch 454 assures that the extent of movement of each chain conveyor 346 is such that the next gate 348 is moved and brought into engagement with the cam structure 354. The cam structure 354 has suitable surface means which engage the trigger 372 of each gate 348 as it is moved thereagainst. As each gate 348 is indexed away from the cam structure 354 the trigger 372 is released and the three patties 12 upstream thereof are moved in an efficient manner out of accumulator 300 onto the collection device 340.

The drive 352 for the gate means 338 is also operatively connected through a pair of gears as shown at 456 and a chain and sprocket assembly 458 to a drive shaft 460. The drive shaft 460 serves to rotate the supply roll 345 in the desired manner to assure that paper 344 is always present on the collection device 340 to support patties 12 being discharged from th accumulator 300.

Thus, it is seen that the accumulator 300 receives patties 12 in two rows in this example of the invention. The accumulator has moving means 336 for moving the patties therethrough and the moving mean generally operates so that the articles are moved in a comparatively high speed manner when compared with the speed that the gates 348 are moved. The accumulator 300 of this example has gate means 338 comprised of two sets of gates with each set having an associated sprocket chain 346 and gates 348 detachably fastened thereto. The sprockets 346 and hence the gates 348 associated therewith are driven by gate drive 352 in an indexing and comparatively lower speed than the movement imparted to the patties 12 by the moving means 336. As previously explained the moving means 336 moves patties 12 rapidly in position against the gates 348 and the gates provide their controlling spacing function in a precise manner. Further, the gates 348 are driven so as to allow movement onto the collection device 340 once the gating function has been completed. The operation of the collection device 340 was described previously.

In this disclosure of the invention the gates 348 are suitably spaced with a gate pitch 350 therebetween so that a plurality of three patties 12 are controlled by the gates in the manner previously described. However, it is to be understood that any desired number of patties may be controlled by a pair of immediately adjacent gates by precisely controlling the gate pitch 350. Thus, a single patty 12 may be controlled by the gates 348 associated with a particular chain conveyor 346 or any desired plurality of patties 12, other than three, may be controlled by the gates 348.

In this disclosure of the invention the various electrical lines, connections, controls, supports, and the like for the various motors, drives, etc. have not been illustrated. However, it is to be understood that these items would be provided, as desired, and would be constructed, arranged, and operated in any suitable manner known in the art.

The various drive motors used in the apparatus disclosed herein may be electric drive motors or such drive motors may be pneumatic or hydraulic motors which, in turn, may be electrically driven.

Each chain conveyor 346 has toothed sprocket wheels or sprockets 464 at opposite ends thereof and the toothed sprockets may be of any suitable size and may be readily removed and replaced on their shafts 451. Further, in order to control the movement of the gate means 338 in a precise manner not only is it feasible to control the drive means for the driven shaft 451 but it is also feasible to provide support blocks 466 for each shaft 451 which have suitable means which enable easy removal of the shaft 451 and thereby enable changing sprockets 464 to provide those of desired size.

As each chain conveyor 346 moves its gates 348 into position for operative association with patties 12 at the upstream end of the accumulator 300 there is a tendency for the rod 384 of the trigger 37Z to stab a patty 12 which it might come in contact with and as shown at 468 in FIG. 18. To preclude this possibility a suitable cam device 470 is provided at the upstream end of each chain conveyor 346 which serves to hold the associated gates 348 approximately horizontal as they approach the patties 12 to preclude the stabbing action. The cam device 470 has suitable cooperating surfaces which engage the surfaces of each gate 348 to preclude the above-mentioned stabbing action.

In this modification of the apparatus 10 of the invention, the accumulator 300 is shown provided with means for handling two rows of patties 12. However, it is to be understood that the accumulator 300 may be modified to handle a single row or any desired plurality of rows.

In the modification of FIGS. 13-21 provision has been made for an accumulator feed device 310. However, it is to be understood that the feed device 310 need not necessarily be provided or provided as shown inasmuch as patties 12 may be fed directly into the main portion of the accumulator 300 by appropriate structure other than the structure illustrated.

The gates 348 illustrated and described herein are held by associated slide rails 360 in the manner previously described. It will be appreciated that the slide rails 360 are positioned and suitably supported in a precise manner on the accumulator 300. In addition, the precise placement of the slide rails together with the roller assemblies 406 assure that the patties 12 are moved through the accumulator with precision and while applying the desired pressure on each patty as it passes under or comes into operative association with each gate 348.

The utilization of the gates 348 in the manner described herein enables the handling of not only any desired number of patties to provide a precise gating action but the patties or similar articles may vary substantially in size without adversely affecting the operation of the overall apparatus 10 and accumulator 300. The accumulator 300 functions as a collater and a device for discharging articles or patties from the overall apparatus.

The accumulator 300 of this modification of the invention assures that shingling of patties is avoided. Further, excessive pressure on the patties or similar products during handling is also avoided and even though the patties 12 are hard frozen the avoidance of excessive pressure enables a wide variety of products to be handled including non food items or softer food patties.

The accumulator 300 of this embodiment may be considered a quick change tooling station for products being processed. It is readily possible to change from one product to another product of different size and shape by making appropriate changes in the accumulator within a time frame of roughly thirty minutes.

Reference is made in this disclosure of the invention to the handling of food articles in the form of frozen hamburger patties of circular cross section. However, it is to be understood that the articles need not necessarily be frozen and further that the articles may be of any shape and may consist of other food products such as chicken patties whether circular or oval in shape, sausage patties, and the like. Further, as previously suggested, the apparatus of this invention need not necessarily be utilized to handle food items although it is preferably used for this purpose.

Terms such as top, end, upper, lower, and the like have been used throughout this disclosure for ease of presentation and to describe the construction and arrangement of components as illustrated in the drawings. However, it is to be understood that these terms are not to be considered limiting in any way.

While the invention has been described in conjunction with various specific embodiments and modifications, it is evident that many alternatives, modifications, and variations will be apparent to those skilled in the art, in light of the foregoing description. Accordingly, it is intended to embrace all such alternatives, modifications, and variations as fall within the spirit and scope of the appended claims.

What is claimed is:

1. In an apparatus for arranging randomly oriented articles of roughly equal size in a predetermined pattern comprising, means for receiving said articles and disposing same in at least one substantially rectilinear row and in a single layer thereof, an accumulator for receiving said articles from said row, said accumulator having driven moving means for moving said articles therethrough and cooperating driven gate means for controlling the articles moved through said accumulator, said moving means and gate means being independently driven, and a collection device for collecting said articles from said accumulator, the improvement wherein said gate means comprises, a mechanism supported for movement in an endless path, said mechanism being disposed above at least a portion of said accumulator, a plurality of gates carried by said mechanism in spaced relation with a particular pitch between immediately adjacent gates establishing a predetermined number of said articles therebetween, means for serially indexing said mechanism a distance equal to said pitch to thereby move a gate disposed immediately adjacent said collection device and thus allow movement of the predetermined number of articles immediately upstream of said immediately adjacent gate out of said accumulator to said collection device, and a fixed non-rotatable means adapted to actuate said gates upon movement of each gate thereagainst, said means for indexing operating to move an exit gate actuated by said fixed nonrotatable means away from said fixed nonrotatable means to thereby allow movement of the predetermined number of articles immediately upstream of said exit gate out of said accumulator to said collection device.

2. In an apparatus for arranging randomly oriented articles of roughly equal size in a predetermined pattern comprising, means for receiving said articles and disposing same in a plurality of substantially rectilinear rows of articles with each row consisting of a single layer thereof, an accumulator for receiving said articles from each row, said accumulator having driven moving means for moving said articles therethrough and cooperating driven gate means for controlling the articles moved through said accumulator, said moving means and gate means being independently driven, and a collection device for collecting said articles from said accumulator, the improvement wherein said gate means comprises, a plurality of mechanisms supported for movement in an endless path, each of said mechanisms being disposed above at least a portion of said accumulator, a plurality of gates carried by each of said mechanisms in spaced relation with a particular pitch between immediately adjacent gates establishing a predetermined number of articles therebetween, means for serially indexing said mechanisms in a simultaneous manner a distance equal to said pitch to thereby move a gate disposed immediately adjacent said collection device and thus allow movement of the predetermined number of articles immediately upstream of said immediately adjacent gate out of said accumulator to said collection device, and a fixed nonrotatable means adapted to actuate said gates upon movement of each gate thereagainst, said means for indexing operating to move an exit gate actuated by said fixed nonrotatable means away from said fixed nonrotatable means to thereby allow movement of the predetermined number of articles immediately upstream of said exit gate out of said accumulator to said collection device.

3. In an apparatus for arranging randomly oriented articles in a predetermined pattern comprising, means for receiving said articles and disposing same in at least one substantially rectilinear row and in a single layer thereof, an accumulator for receiving said articles, said accumulator having moving means for moving said articles therethrough and cooperating gate means for controlling the articles moved through said accumulator, and a collection device for collecting said articles from said accumulator, the improvement wherein said moving means comprises means engaging top and bottom surfaces of said articles and sandwiching same therebetween, said means engaging top and bottom surfaces serving to move said articles to said collection device, and said gate means is disposed above said articles and accumulator and comprises pressure applying means cooperating with said means engaging top and bottom surfaces to apply pressure substantially perpendicularly against each article as each article is moved beneath associated gate means to assure efficient movement through said accumulator.

4. An apparatus as set forth in claim 3 in which said pressure-applying means comprises shaft means carrying roller means, said roller means operating to urge associated ones of said means engaging top and bottom surfaces against each article as each is moved beneath associated gate means.

5. An apparatus as set forth in claim 3 in which said means engaging top and bottom surfaces comprises belt means, and said belt means comprises a plurality of spaced apart endless belts engaging said top surfaces and a plurality of spaced apart endless belts engaging said bottom surfaces.

6. An apparatus as set forth in claim 5 in which each of said plurality of endless belts has a maximum dimension perpendicular to its longitudinal axis which is a fractional part of the smallest dimension of said articles to be engaged by said belts such tat said articles have exposed unsupported top surface portions between those belts engaging said top surfaces and exposed unsupported bottom surface portions between those belts engaging said bottom surfaces.

7. An apparatus as set forth in claim 1 in which said moving means engages top and bottom surfaces of said articles sandwiching same therebetween and said moving means serves to move said articles to said collection device.

8. An apparatus as set forth in claim 7 in which said moving means comprises belt means defined by a plurality of spaced apart endless belts each of circular cross section engaging said top surfaces and a plurality of spaced apart endless belts each also of circular cross section engaging said bottom surfaces.

9. In a method of making an apparatus for arranging randomly oriented articles of roughly equal size in a predetermined pattern comprising the steps of, providing means for receiving said articles and disposing same in at least one substantially rectilinear row and in a single layer thereof, providing an accumulator for receiving said articles from said row, said step of providing an accumulator comprising the steps of providing moving means for moving said articles through an accumulator and providing cooperating gate means for controlling the articles moved through said accumulator, driving said moving means and gate means using independent means, and disposing a collection device for collecting said articles from said accumulator downstream thereof, the improvement in said method wherein said step of providing gate means comprises, providing a mechanism and supporting same for movement in an endless path while disposing said mechanism above at least a portion of said accumulator, detachable fastening a plurality of gates on said mechanism in spaced relation with a particular pitch between immediately adjacent gates thereby establishing a predetermined number of said articles therebetween, providing means for serially indexing said mechanism a distance equal to said pitch to thereby move a gate disposed immediately adjacent said collection device and thus allow movement of the predetermined number of articles immediately upstream of said immediately adjacent gate out of said accumulator to said collection device, and providing a fixed nonrotatable means adapted to actuate said gates upon movement of each gate thereagainst, said means provided for indexing operating to move an exit gate actuated by said separate means away from said fixed nonrotatable means to thereby allow movement of the predetermined number of articles immediately upstream of said exit gate out of said accumulator to said collection device.

\* \* \* \* \*